(12) United States Patent
Jeschke et al.

(10) Patent No.: US 12,381,354 B2
(45) Date of Patent: Aug. 5, 2025

(54) ELECTRICAL CONNECTOR

(71) Applicant: Siemens Energy Limited, Newcastle Upon Tyne (GB)

(72) Inventors: Michael Jeschke, Ulverston (GB); Daniel Walton, Carnforth (GB); Chantelle Duckworth, Thornton Cleveleys (GB); Nigel Slater, Thornton Cleveleys (GB)

(73) Assignee: Siemens Energy Limited, Newcastle Upon Tyne (GB)

( * ) Notice: Subject to any disclaimer, the term of this patent is extended or adjusted under 35 U.S.C. 154(b) by 461 days.

(21) Appl. No.: 17/920,709

(22) PCT Filed: May 13, 2021

(86) PCT No.: PCT/EP2021/062777
§ 371 (c)(1),
(2) Date: Oct. 21, 2022

(87) PCT Pub. No.: WO2021/233768
PCT Pub. Date: Nov. 25, 2021

(65) Prior Publication Data
US 2023/0344166 A1     Oct. 26, 2023

(30) Foreign Application Priority Data
May 18, 2020  (GB) ........................... 2007325

(51) Int. Cl.
*H01R 13/53* (2006.01)
*C08G 65/40* (2006.01)
(Continued)

(52) U.S. Cl.
CPC ....... *H01R 13/533* (2013.01); *C08G 65/4056* (2013.01); *H01R 13/405* (2013.01)

(58) Field of Classification Search
CPC .... H01R 13/533; H01R 13/405; H01R 13/53; H01R 13/40; H01R 13/523;
(Continued)

(56) References Cited

U.S. PATENT DOCUMENTS

| 4,320,224 A | 3/1982 | Rose |
| 2005/0208839 A1* | 9/2005 | Mott ................ B29C 45/14639 |
| | | 439/722 |

(Continued)

FOREIGN PATENT DOCUMENTS

| EP | 2067823 A1 | 6/2009 |
| GB | 2506635 A | 4/2014 |

(Continued)

OTHER PUBLICATIONS

International Search Report and Written Opinion of the International Searching Authority mailed Jul. 30, 2021 corresponding to PCT Application No. PCT/EP2021/062777 filed May 13, 2021.

(Continued)

*Primary Examiner* — Truc T Nguyen
(74) *Attorney, Agent, or Firm* — Wolter Van Dyke Davis, PLLC

(57) ABSTRACT

An electrical connector for supplying power to electrical equipment includes a first connector part with an electrically conductive pin and an insulating layer, and a second connector part with a socket. The electrically conductive pin in the first connector part is configured for engagement with the socket of the second connector part and for transmitting power or data or both through the electrically conductive pin to the socket part. The insulating layer is in intimate contact with and at least partially covering the electrically conductive pin and electrically insulates the pin from a body of the first connector part of the connector. The insulating layer includes a polymeric material having a repeat unit of for- (Continued)

mula: —O-Ph-Ph-O-Ph-CO-Ph- (I) and a repeat unit of formula —O-Ph-Ph-O-Ph-SO2-Ph-Ph-SO2-Ph- (II) wherein Ph represents a phenylene moiety; and wherein the repeat units I and II are in the relative molar proportions 95:5 to 80:20.

21 Claims, 3 Drawing Sheets

(51) Int. Cl.
*H01R 13/405* (2006.01)
*H01R 13/533* (2006.01)

(58) Field of Classification Search
CPC ............... C08G 65/4056; C08G 75/23; C08G 65/4012; C08L 81/06; C08L 71/08; E21B 33/0385
See application file for complete search history.

(56) References Cited

U.S. PATENT DOCUMENTS

| | | | | |
|---|---|---|---|---|
| 2008/0233786 A1* | 9/2008 | Hughes | ................ | H01R 13/53 |
| | | | | 439/296 |
| 2011/0021049 A1* | 1/2011 | Ramasubramanian | ...................... | |
| | | | | H01R 13/521 |
| | | | | 439/271 |
| 2011/0034066 A1* | 2/2011 | Jazowski | ............ | E21B 33/0385 |
| | | | | 439/426 |
| 2016/0177031 A1 | 6/2016 | Chaplin | | |
| 2016/0261064 A1* | 9/2016 | Saydyk | .................... | G01V 1/04 |
| 2017/0201039 A1 | 7/2017 | Jenkin | | |
| 2017/0256899 A1* | 9/2017 | Mitchell | ................ | H01R 13/53 |
| 2018/0034198 A1* | 2/2018 | Lyon | ...................... | H01R 29/00 |
| 2019/0089091 A1* | 3/2019 | Luo | ......................... | H01R 13/53 |

FOREIGN PATENT DOCUMENTS

| | | |
|---|---|---|
| GB | 2517578 A | 2/2015 |
| GB | 2576156 A | 2/2020 |
| WO | 2015001327 A1 | 1/2015 |
| WO | 2021233768 A1 | 11/2021 |

OTHER PUBLICATIONS

"Research Disclosure—High Tg Polyaryletherketones"; Research Disclosure, Kenneth Mason Publications, Hampshire, UK, GB; vol. 580; No. 3; Aug. 1, 2012 (Aug. 1, 2012); p. 590; XP007141468; ISSN: 0374-4353; 2012.

Seymour, Raymond Benedict, 1912-Structure-property relationships in polymers. ISBN-13: 978-1-4684-4750-7e-ISBN-13: 978-1-4684-4748-4. DOI: 10.1007/978-1-4684-4748-4; 1984.

* cited by examiner

ELECTRICAL CONNECTOR

CROSS REFERENCE TO RELATED APPLICATIONS

This application is the US National Stage of International Application No. PCT/EP2021/062777 filed 13 May 2021, and claims the benefit thereof. The International Application claims the benefit of United Kingdom Application No. GB 2007325.0 filed 18 May 2020. All of the applications are incorporated by reference herein in their entirety.

FIELD OF INVENTION

The present invention relates to an electrical connector for supplying power to electrical equipment, for example in a land based, or subsea, oil or gas well. It also relates to downhole termination assemblies and methods of manufacturing electrical connectors for land based or subsea applications.

BACKGROUND OF INVENTION

Typically a well is provided with a tubing hanger for suspending production tubing which extends into a reservoir or a dummy reservoir. The tubing hanger may also house an electrical connector which terminates a cable which extends downhole to supply power to electrical equipment such as an electric submersible pump located in the reservoir or dummy reservoir. Such connectors in the tubing hanger are subjected to hostile conditions such as extreme temperatures and pressures and aggressive chemicals and thus the connectors need to be designed to deal with these conditions.

A known system for this environment is the SpecTRON 5 (trademark) Electrical Submersible Pump (ESP) power feedthrough system produced by Tronic Limited. This system comprises a connector for terminating the cable which extends downhole. The termination between the cable and a pin is formed by means of a cable crimp between the two parts. The termination is covered by an elastomeric termination sleeve which is stretched over the end of the cable and connector pin.

This termination is housed in a cable termination chamber which is sealed from the downhole environment by an elastomeric diaphragm and an elastomeric cable boot. The elastomeric diaphragm is filled with a dielectric gel. The diaphragm is flexible and can transmit pressure from the ambient environment to the connector internals to maintain a minimal pressure differential.

Such electrical connectors may operate at either a relatively low voltage for powering monitoring and communications equipment, at voltages of 5-10 kV for powering equipment, which for subsea applications may be either on the seabed or downhole in a subsea well, or at voltages of around 45 kV for delivering power to subsea cables. Therefore such connector pins may be exposed to high voltages in use.

The connector pin of such electrical connectors is typically coated with an electrically insulating material to cover the pin and protect the other parts of the electrical connector from the high voltage and heat generated in the pin in use. For subsea applications in particular, such electrically insulating materials may have a relatively short lifetime due to difficulty in providing a material which has sufficient resistance to electrical breakdown whilst having suitable mechanical properties for functioning in the demanding conditions on the sea bed (e.g. at depths of up to 4,000 m) or downhole in subsea wells.

SUMMARY OF THE INVENTION

It is one aim of the present invention, amongst others, to provide an electrical connector that addresses at least one disadvantage of the prior art, whether identified here or elsewhere, or to provide an alternative to existing connectors. For instance, it may be an aim of the present invention to provide an electrical connector comprising a pin and insulating layer, wherein the insulating layer may have improved resistance to electrical breakdown compared to known insulating layers.

According to aspects of the present invention, there is provided an electrical connector, assembly, method and use as set forth in the appended claims. Other features of the invention will be apparent from the dependent claims, and the description which follows.

According to a first aspect of the present invention, there is provided an electrical connector for conveying electricity to equipment, the connector comprising a first connector part comprising an electrically conductive pin and an insulating layer, and a second connector part comprising a socket; wherein the electrically conductive pin in the first connector part is configured for engagement with the socket of the second connector part and for transmitting power or data or both through the electrically conductive pin to the socket part; wherein the insulating layer is in intimate contact with and at least partially covering the electrically conductive pin and electrically insulates the pin from a body of the first connector part of the connector; wherein the insulating layer comprises a polymeric material having a repeat unit of formula:

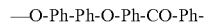
—O-Ph-Ph-O-Ph-CO-Ph-    I and a repeat unit of formula:

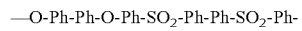
—O-Ph-Ph-O-Ph-SO$_2$-Ph-Ph-SO$_2$-Ph-    II wherein Ph represents a phenylene moiety; and wherein the repeat units I and II are in the relative molar proportions 95:5 to 80:20.

The electrical connector may comprise a subsea electrical connector.

According to a second aspect of the present invention, there is provided a cable termination assembly comprising an electrical connector according to the first aspect and a cable which is connected to the connector and arranged to extend from a tubing hanger to electrical equipment.

The cable termination assembly may comprise a subsea cable termination assembly.

The assembly may include some or all of the suitable features and benefits described herein in relation to the first aspect.

According to a third aspect of the present invention, there is provided a method of manufacturing an electrical connector, the connector comprising first and second connector parts; the method comprising:

a) providing an electrically conductive pin in the first connector part for engagement with a socket of the second connector part and for transmitting power and/or data through the pin from of the first connector part to the socket of the second connector part; and b) providing an insulating layer in intimate contact with at least a portion of the pin, the insulating layer comprising a polymeric material, the polymeric material having a repeat unit of formula:

—O-Ph-Ph-O-Ph-CO-Ph-    I and a repeat unit of formula:

—O-Ph-Ph-O-Ph-SO$_2$-Ph-Ph-SO$_2$-Ph-    II wherein Ph represents a phenylene moiety;
wherein the repeat units I and II are in the relative molar proportions 95:5 to 80:20;
  c) arranging the pin and the insulating layer in the electrical connector.

The method may comprise a method of manufacturing a subsea electrical connector.

The method may comprise providing some or all of the features discussed herein in relation to the connector of the first aspect or the assembly of the second aspect.

According to a fourth aspect of the present invention, there is provided a use of a polymeric material for electrically insulating a pin of an electrical connector, the polymeric material having a repeat unit of formula:

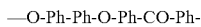
—O-Ph-Ph-O-Ph-CO-Ph-    I and a repeat unit of formula;

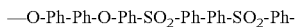
—O-Ph-Ph-O-Ph-SO$_2$-Ph-Ph-SO$_2$-Ph-    II wherein Ph represents a phenylene moiety;
wherein the repeat units I and II are in the relative molar proportions 95:5 to 80:20.

The pin may comprise a pin of a subsea electrical connector.

The use may include some or all of the suitable features and benefits described herein in relation to the first, second and third aspects.

The discussion below relates to the connector according to the first aspect, as well as the assembly according to the second aspect, the method according to the third aspect, and the use according to the fourth aspect.

Typically such electrical connectors have an insulating layer covering a major portion of the pin between two exposed ends of the pin, which may be termed a socket-side tip and a cable-side tip of the pin.

In some prior art systems, pins have comprised polyether ether ketone (PEEK) thermoplastic homopolymers which are able to withstand temperatures of up to 135° C. The inventors have found that insulating layers in the electrical connectors of this first aspect comprising the polymeric material as defined herein may be able to withstand greater mechanical loading at higher temperatures. The inventors have also found that compared to prior art polymers, the polymeric material as defined herein may have an increased electrical breakdown strength at room temperature, and a greater degree of this strength is maintained at elevated temperature than with prior art materials.

Such polymeric materials have been previously disclosed in WO2015001327 A1 where the improved mechanical properties of such polymeric materials were described in the context of providing o-rings for oil and gas production equipment which are able to withstand high temperatures, high pressure and corrosive chemicals. The present inventors have surprisingly found that such polymeric material can provide insulating layers in electrical connectors which may have improved electrical breakdown strength at elevated temperatures. This is particularly applicable for subsea applications.

The present invention may therefore provide an improved electrical connector which may significantly increase the operational temperature and voltage ratings of connectors thereby boosting the performance and efficiency of this equipment. The present invention may therefore allow the introduction of higher power rated connectors and/or smaller connector designs that deliver the same power compared to direct equivalents that use prior art polymeric insulating layers.

By "subsea" is meant equipment which is suitably for deployment underwater, for example on the seabed. The electrical connector of this first aspect may be suitably for use in subsea applications, for example on or near the sea bed or downhole in an onshore or a subsea oil or gas well. For use in subsea application, the electrical connector of this first aspect may be termed a subsea electrical connector. For other, non-subsea applications, the connector may be termed an electrical connector.

The electrical connector according to the first aspect is suitably for supplying electricity to electrical equipment or for connecting to an electrical power supply cable, whether subsea, or otherwise. The electricity may have a voltage of at least 1 kV, suitably at least 5 kV, for example at least 10 kV. The electricity may have a voltage of up to 60 kV, suitably up to 50 kV, for example up to 45 kV. The electricity suitably has a voltage of from 1 kV to 60 kV, suitably from 1 kV to 50 kV, suitably from 5 kV to 50 kV.

For subsea use, the electrical connector may be exposed to seawater at temperatures of 0 to 20° C., for example, 5 to 10° C., on deployment into the sea. Some parts of the electrical connector, for example, the insulating layer, may be exposed to temperatures during operation (when electricity is passing through the electrical connector) of greater than 100° C., suitably greater than 120° C., suitably up to 200° C., suitably up to 160° C.

The connector may be subjected to a temperature of from 100° C. to 200° C., suitably from 120° C. to 160° C., in use.

The connector may be positioned so that it is subjected to a pressure of at least 10 MPa, suitably at least 20 MPa, suitably at least 30 MPa, in use. The connector may be positioned so that it is subjected to a pressure of up to than 300 MPa, suitably up to 260 MPa or up to 220 MPa in use. The connector may be subjected to a pressure of up to 180 MPa, suitably up to 140 MPa, suitably up to 100 MPa, in use.

The connector may be subjected to a pressure of from 10 MPa to 140 MPa, in use.

For reference, a typical maximum subsea depth pressure may be 40 MPa and a typical oil well may operate under a pressure range of from 34.5 MPa to 138 MPa.

Suitably the connector is subjected to a temperature in the range 100° C. to 200° C., suitably 120° C. to 160° C., and a pressure in the range 40 MPa to 300 MPa, suitably 80 MPa to 300 MPa, in use.

The pin is suitably an electrical pin comprising an electrically conducting material, such as a metallic material. Suitably the metallic material comprises copper. Suitably the pin is formed from copper and may be coated with nickel or gold plating, prior to the insulating layer being applied. In some embodiments, the copper pins are provided with the insulating layer on the at least a part of the pin before the nickel or gold plating is applied, suitably to the exposed tips of the pin.

The pin suitably has an elongated shape. The elongated shape may have a circular cross-section. Alternatively, the elongated shape may have a polygonal cross-section, for example, a quadrilateral cross-section. Suitable shapes for electrical pins will be known to the person skilled in the art.

The insulating layer is arranged in contact with and partially covering the pin. Suitably the insulating layer electrically isolates the pin from the body of the electrical connector. Suitably the insulating layer covers all of the pin except for the region of the pin intended to contact said socket.

The polymeric material is suitably arranged between the pin and at least one other component of the connector. The at least one other component may be a housing, or a component discussed below in relation to the second aspect.

The polymeric material is suitably an electrically insulating material.

The insulating layer is suitably mainly formed of the polymeric material and any filler present. The insulating layer suitably comprises at least 80 wt % of the polymeric material, suitably at least 90 wt %, for example at least 95 wt % of the polymeric material, and any filler present. The insulating layer suitably consists essentially of the polymeric material or consists of the polymeric material and any filler present.

Then polymeric material has the repeat units I and II as defined above in a ratio of from 95:5 to 80:20. The phenylene moieties (Ph) in each repeat unit of the polymeric material may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. The polymeric material is suitably highly crystalline and, accordingly, the polymeric material suitably includes relatively high levels of phenylene moieties with 1,4-linkages.

Suitably at least 95%, advantageously at least 99%, of the number of phenylene moieties (Ph) in the repeat unit of formula I have 1,4-linkages to moieties to which they are bonded. Suitably each phenylene moiety in the repeat unit of formula I has 1,4-linkages to moieties to which it is bonded.

Suitably at least 95%, advantageously at least 99%, of the number of phenylene moieties (Ph) in the repeat unit of formula II have 1,4-linkages to moieties to which they are bonded. Suitably each phenylene moiety in the repeat unit of formula II has 1,4-linkages to moieties to which it is bonded.

The phenylene moieties in repeat unit of formula I are suitably unsubstituted. The phenylene moieties in repeat unit of formula II are suitably unsubstituted.

Said repeat unit of formula I suitably has the structure:

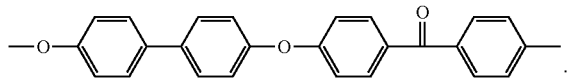

III

Said repeat unit of formula II suitably has the structure:

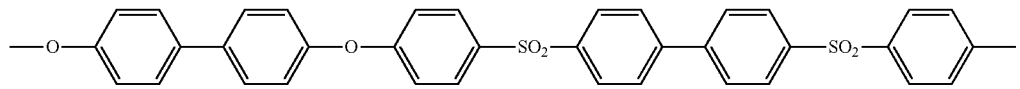

IV

The polymeric material may include at least 81 mol %, suitably at least 82 mol % of repeat units of formula I. The polymeric material may include at least 83 mol %, suitably at least 84 mol % of repeat units of formula I. The polymeric material may include less than 90 mol %, suitably 88 mol % or less of repeat units of formula I. The polymeric material may include 81 to 91 mol %, suitably 82 to 88 mol %, for example, 84 to 86 mol % of units of formula I.

The polymeric material may include at least 10 mol %, suitably at least 12 mol %, of repeat units of formula II. The polymeric material may include less than 19 mol %, suitably less than 18 mol % of repeat units of formula II. The polymeric material may include 17 mol % or less; suitably 16 mol % or less of repeat units of formula II. The polymeric material may include 9 to 19 mol %, suitably 12 to 18 mol %, for example, 14 to 16 mol % of units of formula II.

Suitably the polymeric material comprises 81 mol % to 90 mol % of repeat units of formula I and 10 mol % to 19 mol %, advantageously 12 mol % to 18 mol % of repeat units of formula II. Suitably the polymeric material comprises 82 mol % to 88 mol % of repeat units of formula I and 12 mol % to 18 mol % of repeat units of formula II.

The sum of the mol % of units of formula I and II in the polymeric material is suitably at least 95 mol %, suitably at least 98 mol %, suitably at least 99 mol %, for example, 100 mol %.

The ratio defined as the mol % of units of formula I divided by the mol % of units of formula II in said polymeric material may be in the range 4.2 to 9.0, suitably in the range 4.8 to 7.3, for example in the range 5.2 to 6.2.

Suitably the polymeric material comprises at least 85 wt % the repeat units of formula I and formula II, suitably at least 90 wt %, suitably at least 95 wt % or at least 99 wt %, for example, 100 wt % of repeat units of formula I and formula II.

The melting temperature (Tm) of the polymeric material may be less than 430° C., suitably less than 420° C., for example, less than 410° C. The Tm may be greater than 320° C., for example, greater than 330° C., 340° C. or 350° C. The Tm is suitably in the range 350° C. to 410° C.

The glass transition temperature (Tg) of the polymeric material may be greater than 160° C., suitably greater than 170° C., for example, 180° C. or greater. The Tg may be less than 240° C., suitably less than 220° C. The Tg is suitably in the range 180° C. to 220° C.

The Tm, Tg and Heat of Fusion of Melting (ΔHm) of the polymeric material are suitably determined by differential scanning calorimetry (DSC). For example, a sample of polymeric material, suitably in the form of a powder, is scanned by DSC as follows:
1. Perform a preliminary thermal cycle by heating the sample from 30° C. to 450° C. at 20° C./min.
2. Hold for 5 minutes.
3. Cool at 20° C./min to 30° C. and hold for 5 mins.
4. Re-heat from 30° C. to 450° C. at 20° C./min, recording the Tg, Tm and ΔHm.

From the DSC trace resulting from the scan in step 4, the onset of the Tg is obtained as the intersection of the lines drawn along the pre-transition baseline and a line drawn along the greatest slope obtained during the transition. The Tm is the temperature at which the main peak of the melting endotherm reaches maximum.

The Heat of Fusion for melting (ΔHm) is obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which is 140 J/g.

The difference (Tm−Tg) between the Tm and Tg of the polymeric material may be at least 160° C., suitably at least 180° C., for example at least 190° C. The difference may be less than 250° C., suitably less than 210° C. Suitably the difference is in the range 200° C. to 220° C.

Suitably the polymeric material has a Tg in the range 180° C. to 220° C., a Tm in the range 350° C. to 400° C. and the difference between the Tm and Tg is in the range 200° C. to 220° C.

The polymeric material may have a crystallinity measured as described above of at least 25%, suitably at least 30%. The crystallinity may be less than 50%, for example, less than 45%.

The breakdown voltage of the polymeric material is suitably at least 23 kV/mm, suitably at least 24 kV/mm, for example at least 25 kV/mm. The breakdown voltage of the polymeric material may be at least 26 kV/mm.

The polymeric material suitably has a melt viscosity (MV) of at least 0.05 kNsm$^{-2}$, suitably at least 0.10 kNsm$^{-2}$, suitably at least 0.20 kNsm$^{-2}$, for example at least 0.25 kNsm$^{-2}$. The polymeric material may have a MV of less than 2.0 kNsm$^{-2}$, suitably less than 1.2 kNsm$^{-2}$. The MV may be in the range 0.2 kNsm$^{-2}$ to 0.8 kNsm$^{-2}$, suitably in the range 0.42 kNsm$^{-2}$ to 0.63 kNsm$^{-2}$, for example 0.49 kNsm$^{-2}$ to 0.59 kNsm$^{-2}$. MV is suitably measured using capillary rheometry operating at 435° C. at a shear rate of 1000 s$^{-1}$ using a tungsten carbide die, 0.5 mm×3.175 mm.

The polymeric material may have a tensile strength, measured in accordance with ISO527, of at least 40 MPa, suitably at least 60 MPa, for example at least 80 MPa. The tensile strength is suitably in the range 80 MPa to 110 MPa, for example in the range 80 MPa to 100 MPa.

The polymeric material may have a flexural strength, measured in accordance with ISO178, of at least 130 MPa. The flexural strength is suitably in the range 135 MPa to 180 MPa, for example in the range 140 MPa to 150 MPa.

The polymeric material may have a flexural modulus, measured in accordance with ISO178, of at least 2 GPa, suitably at least 3 GPa. The flexural modulus is suitably in the range 3.0 GPa to 4.5 GPa, for example in the range 3.0 GPa to 4.0 GPa.

The polymeric material may be provided in a composition comprising said polymeric material and a filler. The filler may include a fibrous filler or a non-fibrous filler. The filler may include both a fibrous filler and a non-fibrous filler. The fibrous filler may be continuous or discontinuous.

The fibrous filler may be selected from inorganic fibrous materials, non-melting and high-melting organic fibrous materials, such as aramid fibres, and carbon fibre.

The fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Suitably the fibrous filler is selected from glass fibre and carbon fibre.

The fibrous filler may comprise nanofibres.

The non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous filler may be introduced in the form of powder or flaky particles.

Suitably, the filler comprises one or more fillers selected from glass fibre, carbon fibre, carbon black and a fluorocarbon resin. The filler suitably comprises glass fibre or carbon fibre.

The composition comprising the polymeric material may comprise 20 wt % to 99.9 wt % (e.g. 20 wt % to 70 wt %) of the polymeric material and 0.1 wt % to 80 wt % (e.g. 30 wt % to 80 wt %) of the filler. Suitably the composition comprising the polymeric material includes greater than 10 wt %, for example, greater than 40 wt % of the filler.

The polymeric material described in the preceding aspects may be prepared in a process comprising selecting a compound of formula:

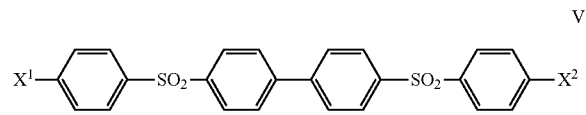

V selecting a compound of formula:

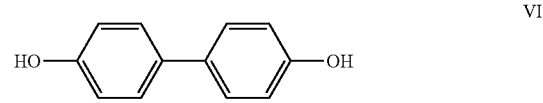 [SMILES: Oc1ccc(-c2ccc(O)cc2)cc1]

VI and selecting a compound of formula:

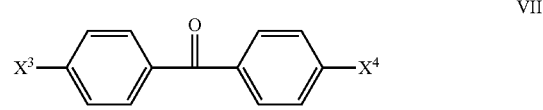

VII and polycondensing said compounds, wherein $X^1$, $X^2$, $X^3$ and $X^4$ independently represent halogen atoms, suitably selected from chlorine and fluorine atoms.

Suitably $X^1$ and $X^2$ represent chlorine atoms. Suitably $X^3$ and $X^4$ represent fluorine atoms.

The molar proportions of compounds V and III are suitably in the range 4.2 to 9; suitably in the range 4.8 to 7.3, for example in the range 5.2 to 6.2.

Suitably, the number of moles of monomers which include halogen atoms which are polycondensed in the process are at least equal to the number of moles of monomers which include two hydroxy groups. The number of moles of monomers which include halogen atoms may be slightly greater than the number of moles of monomers which include two hydroxy groups.

Suitably at least 95 wt %, for example at least 99 wt % of monomers used in the process are made up of monomers of formulae V, VI and VII. Suitably, substantially the only monomers used in the process are those of formulae V, VI and VII.

The process is suitably carried out in the presence of a solvent. The solvent may be of formula:

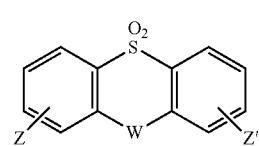

where W is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxanthin dioxide and 4-phenylsulphonyl biphenyl. Suitably the solvent is diphenylsulphone.

The process is suitably carried out in the presence of one or more carbonates which may comprise sodium carbonate, optionally in combination with potassium carbonate.

The total mol % of carbonates used in the process (i.e. the total number of moles of carbonates used in method divided by the total number of moles of hydroxy monomer(s) used, expressed as a percentage) is suitably at least 100%.

The total mol % of carbonates may be greater than 100 mol %. It may be less than 105 mol %.

The mol % of sodium carbonate used in the method may be at least 90 mol %, suitably at least 92 mol %, for example at least 95 mol %.

The sum of the mol % (again related to the moles of hydroxy monomer(s)) of sodium carbonate and potassium carbonate used in the method is suitably at least 100 mol %, for example, greater than 100 mole %. It may be in the range 100 to 105 mol %.

The mol % of carbonates (which term is intended to encompass carbonate ($CO_3^{2-}$) and bicarbonate ($HCO_3^-$)) other than sodium carbonate and potassium carbonate used in the method is suitably less than 5 mol %, for example less than 1 mol % (again related to the moles of hydroxy monomer(s)).

Suitably, the only carbonates used in the method are sodium carbonate and potassium carbonate.

The process is suitably carried out under substantially anhydrous conditions. In the process, the compounds of formula V, VI and VII are suitably contacted in the presence of the solvent, for example diphenylsulphone. Polymerisation is suitably effected at a temperature within the range 150° C. to 400° C. In the process, the reactants are suitably heated up to a maximum temperature which may be greater than 300° C., for example in the range 300° C. to 350° C. Prior to reaching the maximum temperature, the reagents may be held at one or more temperatures lower than the maximum temperature. For example, the process may involve holding the reagents at a temperature within the range 160° C. to 200° C. for at least 20 minutes; and/or may involve holding the reagents at a temperature within the range 200° C. to 240° C. for at least 60 minutes.

The electrical equipment in which the electrical connector of the present invention is to be incorporated, used with or supplied with power from may be subsea, topside, or land based electrical equipment. Examples of such electrical equipment include an Umbilical Termination Assembly (UTA), a distribution assembly or subsea distribution assembly (SDA), a distribution unit, or subsea distribution unit (SDU), a communications interface unit (CIU), an electrical junction box or subsea electrical junction box, a control module or subsea control module (SCM), an electronics module, or subsea electronics module (SEM), a multi-phase pump (MPP), an electrical submersible pump (ESP) [downhole], a gas compressor, or a subsea gas compressor (SGC).

The cable termination assembly according to the second aspect comprises an electrical connector according to the first aspect and a cable which is connected to the connector and arranged to extend from a tubing hanger to electrical equipment. The cable termination assembly may comprise an electrical contact for electrical engagement with a conductor of the cable to form a termination, which, in use, is to be electrically insulated by an insulating portion. The electrical contact is suitably in electrical engagement with the pin of the connector.

The electrical contact may be a conductive sleeve which is arranged to extend around the end portion of the conductor of the cable and which is arranged to extend around the end portion of the pin, which is a second conductor. The conductive sleeve may be attached to the conductors by any means which provides good electrical engagement such as being crimped, by a push fit and or being fixed by one or more fixing members such as a screw. When the electrical contact comprises a conductive sleeve it is suitably attached to the conductor of the cable by means of being crimped and is suitably attached to the pin by a plurality of grub screws which extend radially through the sleeve into the pin.

The cable termination assembly according to the second aspect may comprise a seal for sealing between the insulating portion and the environment. This is particularly important for in subsea or downhole environments. The seal is suitably a metallic seal. By providing such a metallic seal, the insulating portion can be sealed by means of the metallic seal.

As mentioned above, the connectors in the tubing hanger may be subjected to hostile conditions such as extreme temperatures and pressures and aggressive chemicals. Additionally, gases from the well rise up and sit around the connector and elastomers are prone to absorbing these gases.

BRIEF DESCRIPTION OF THE DRAWINGS

For a better understanding of the invention, and to show how example embodiments may be carried into effect, reference will now be made to the accompanying drawings in which.

DETAILED DESCRIPTION OF INVENTION

Figure 1:
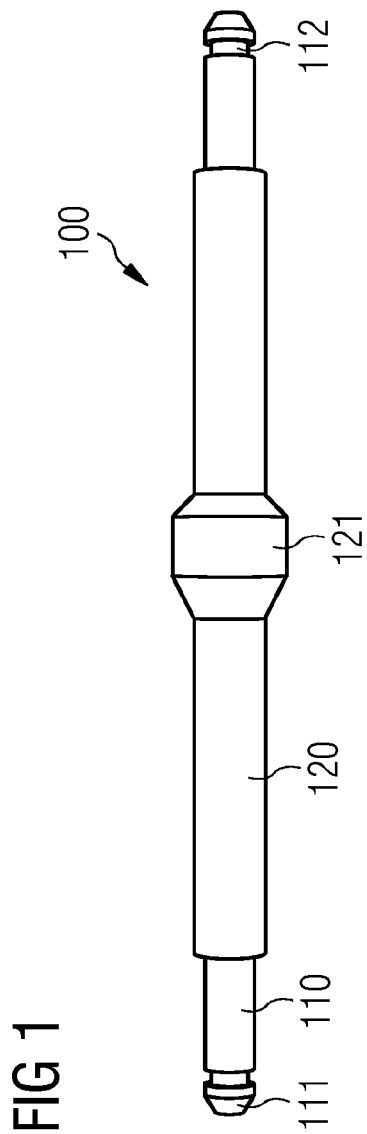
FIG. 1 shows a plan view of a first connector part 100 of an electrical connector according to the first aspect of the present invention.

FIG. 1 shows first connector part 100 of an electrical connector, for example a subsea electrical connector, comprising conductive pin 110 and electrically insulating layer 120. The conductive pin 110 is formed of copper (C109, UNS C14500) and comprises socket-side tip 111 for engagement and electrical connection with a socket, for example on a piece of electrical equipment, and comprises cable-side tip 112 for engagement and electrical connection with a cable. The insulating layer 120 is formed of the polymeric material described in Example 1 below. The insulating layer 120 covers and insulates the conductive pin 110 to protect a body of a cable termination assembly, which may be a subsea cable termination assembly, or otherwise, into which the first connector part 100 is fitted from the electricity conducted through the pin 110 in use and the heat generated as a result. The insulating layer 120 comprises collar 121 to facilitate fitting of the insulating layer 120 into a housing of a cable termination assembly.

Figure 2:
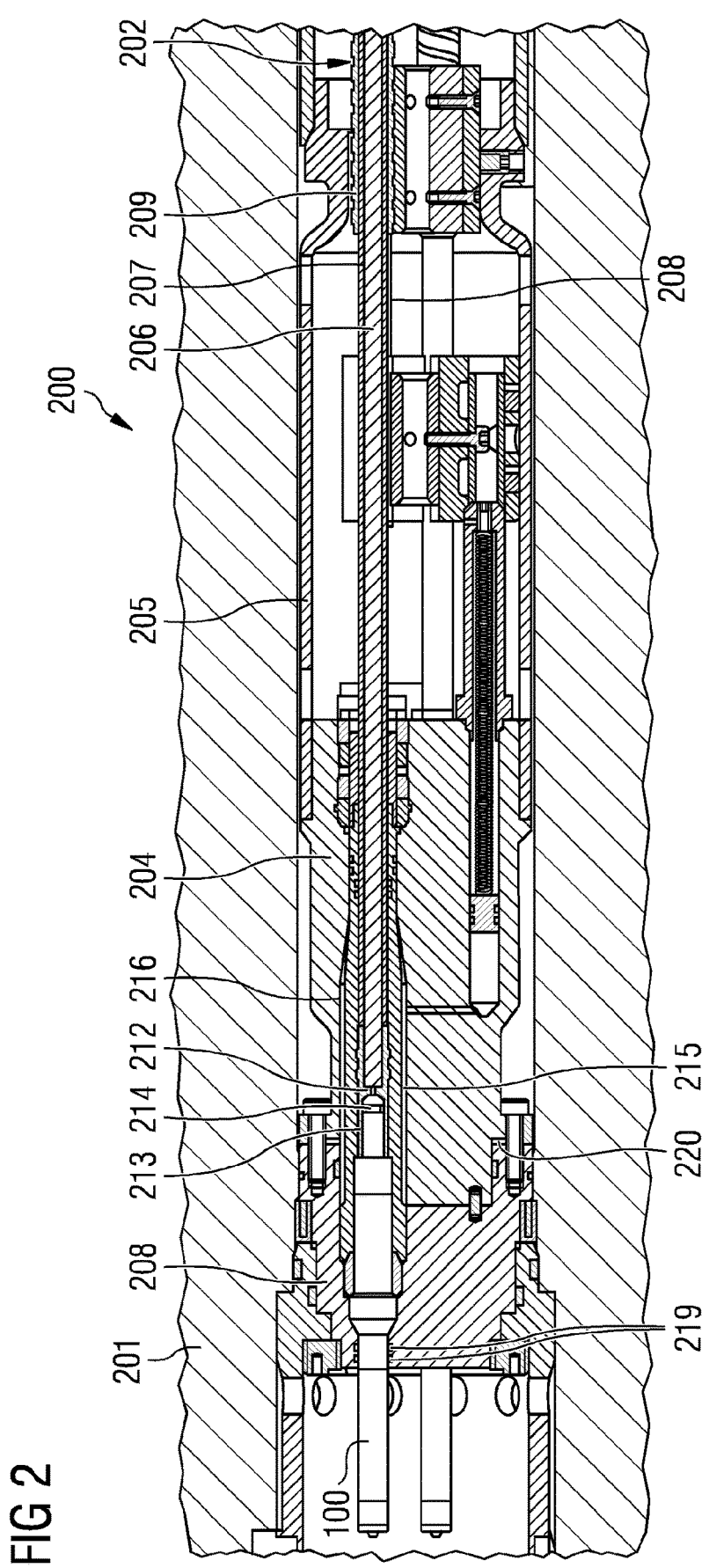
FIG. 2 shows a cross-sectional view of a cable termination assembly 200 according to the second aspect of the present invention.

FIG. 2 shows a cable termination assembly 200 into which the first connector part 100 of FIG. 1 is fitted. The conductive pin 110 is connected to cable 202 which extends from the termination through a termination cover 204 and a tubing hanger receptacle gland housing 205 to electrical equipment (not shown) such as an electric submersible pump. Typically there are three cables within the termination assembly, each of which is terminated to first connector part 100. The arrangement shown in FIG. 2 has three cables, although the cross-section is only through one of the cables and its compensation chamber.

The cable 202 comprises a conductive copper core 206 within an insulating polyether ether ketone (PEEK) sheath 207 which is within a lead sheath 208 and which is in turn within a steel armour 209. Each layer of the cable 202 is concentric with the others.

The copper core 206 of the cable 202 is terminated to the conductive pin 110 of the first connector part 100 by means of a contact terminal 212. The conductive pin 110 is in contact with a multilam 213 within the contact terminal 212 and held therein by a plurality of grubscrews 214 which extend radially through the contact terminal 212 into the conductive pin 110. The termination which comprises the end portion of the conductive core 206 of the cable 202, the cable-side tip 112 of the conductive pin 110, the contact terminal 212 and the multilam 213 is encapsulated in a solid insulating portion 215 which has been cast around the termination. Typically the insulating portion is formed of room temperature vulcanising silicone rubber (RTV) but may be made of any other electrically insulating material.

The cast insulating portion which encapsulates the termination is housed within a chamber 216 provided by a metal housing. The metal housing provides a chamber 216 for each insulated termination. The metal housing comprises the termination cover 204 and an electrical contact support body 218. The chamber 216 for housing the insulating portion 215 is partly provided by the termination cover 204 and partly provided by the electrical contact support body 218.

The conductive pin 110 extends through the electrical contact support body 218 to the termination which is in the part of the chamber 216 provided by the termination cover 204. The electrical contact support body 218 is sealed to the conductive pin 110 by means of two O-rings 219.

The socket-side tip 111 of the conductive pin 110 of first connector part 100 is shown arranged in free space and is available for engagement and electrical connection with a socket of a second connector part to form an electrical connection to a piece of electrical equipment.

The remaining features of the cable termination assembly 200 are as described in GB 2506635 B.

EXAMPLES

Synthesis of Polymer Example 1

4,4'-dihydroxybiphenyl (95.47 g, 0.5 mol), 4,4'-bis(4-chlorophenylsulphonyl) biphenyl (37.76 g, 0.075 mol), 4,4'-difluorobenzophenone (BDF) (95.47 g, 0.4375 mol) and diphenylsulfone (422.7 g) were weighed into a 1 litre flanged flask. The flask was fitted with a mechanical stirrer (set at 125 rpm), a PTFE stirrer gland and a lid containing a condenser, nitrogen inlet, thermocouple inlet and inlet port. The mixture was stirred under nitrogen for 20 minutes at ambient temperature before being lowered into a metal bath at 180° C. Once the contents of the flask were fully molten and the contents temperature reached 180° C., $Na_2CO_3$ (54.98 g, 0.5188 mol) and $K_2CO_3$ (0.17 g, 0.00125 mol) both sieved to 125 μm were mixed and added to the flask. The contents of the flask were heated to 335° C. at 1° C./min and held at that temperature until the desired MV was reached as indicated by the torque rise on the stirrer. The required torque rise was determined from a calibration graph of torque rise versus MV. The reaction mixture was then poured into a foil tray, allowed to cool, pulverised and milled and then washed with 1 litre of acetone, 1 litre of cold water and then hot (50-70° C.) water until the conductivity of the waste water was <2 μS before drying in an oven at 120° C. overnight to provide the polymer of Example 1.

This polymer was evaluated by Differential Scanning Calorimetry (DSC) as follows. A Mettler Toledo, DSC1 Star$^e$ system with FRS5 sensor was used for Differential Scanning Calorimetry (DSC) measurements. The Glass Transition Temperature (Tg), the Cold Crystallisation Temperature (Tn), the Melting Temperature (Tm) and Heat of Fusions of Nucleation (ΔHn) and Melting (ΔHm) for the polymer of Example 1 were determined by DSC.

A sample of polymer powder (5 mg) from Example 1 was scanned by DSC as follows:
1. Perform a preliminary thermal cycle by heating the sample from 30° C. to 450° C. at 20° C./min.
2. Hold for 5 minutes.
3. Cool at 20° C./min to 30° C. and hold for 5 mins.
4. Re-heat from 30° C. to 450° C. at 20° C./min, recording the Tg, Tn, Tm, ΔHn and ΔHm.

From the DSC trace resulting from the scan in step 4, the onset of the Tg was obtained as the intersection of the lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reach maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which was 140 J/g.

The melt viscosity (MV) of the polymer Example 1 was measured as described above.

This gave the following data for polymer Example 1:
MV=0.53 $kNsm^{-2}$, Tg=198° C., Tm=403° C., level of crystallisation=33%.

Synthesis of Polymer Example 2

Polymer Example 2 was prepared by the same procedure described above for Example 1 using 4,4'-bis(4-flurophenylsulphonyl)biphenyl (35.25 g, 0.075 mol) instead of the 4,4'-bis(4-chlorophenylsulphonyl)biphenyl.

The following data for polymer Example 2 was obtained as described above:
MV=0.49-0.59 $kNsm^{-2}$, Tg=194° C., Tm=396° C. level of crystallisation approximately 33%.

Comparative PEEK Polymer

The comparative "PEEK" used in the tests below is Victrex® PEEK 450G; polyetheretherketone having an MV of 0.45 $kNsm^{-2}$, obtained from Victrex Manufacturing Ltd.

Electrical Breakdown Strength Testing

The dielectric breakdown strength of a polymeric material of Examples 1 and 2 was tested according to standard IEC 60243-1 in the following procedure to simulate the operational conditions to which the polymeric material will be exposed in use as the insulating layer of the electrical connector of the first aspect. In these tests Examples 1 and 2 are compared to the prior art PEEK polymeric material described above, which was previously used for the same purpose.

Figure 3A:
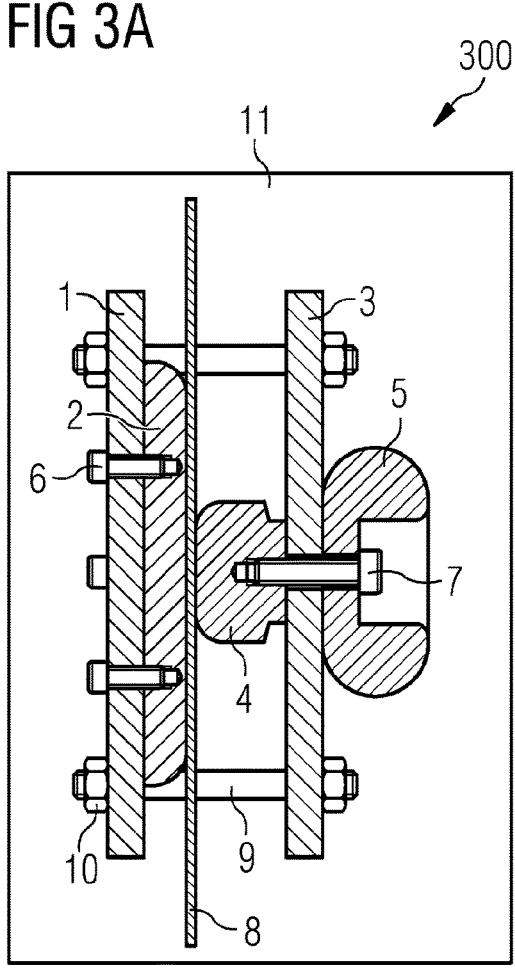
FIG. 3 shows a cross-sectional view (a) and a perspective view (b) of an assembly 300 for testing the dielectric breakdown strength of a polymer as described in Example 1 below.
Figure 3B:
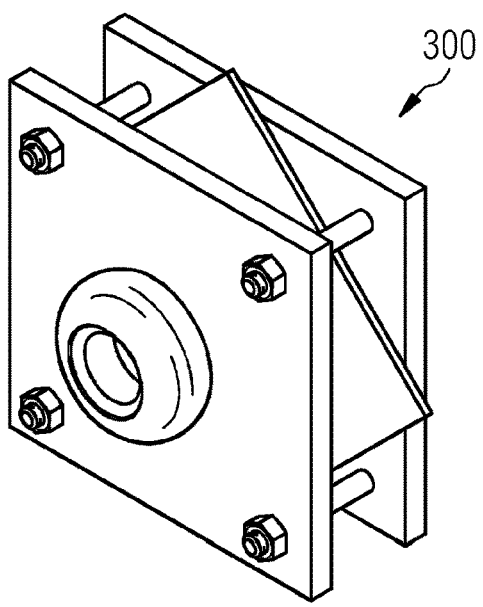

Each run consists of three sections: the assembly setup, the measurement of the partial discharge inception voltage and the measurement of the breakdown voltage. Bracketed numbers refer to the parts of the test assembly shown in FIG. 3.

Part 1—Assembly

The high voltage (HV) connection from the transformer is attached to the head of the M6 bolt (7) and the connection is covered using the stress-control cap (5).

The earth connection is attached to the head of one of the bolts (6) securing the earth electrode (2) to the earth electrode base support (1).

The thickness of the test specimen (8) is measured and recorded in at least three different locations using calibrated micrometers.

The test specimen (8) is cleaned to ensure its surfaces are clear of any dust, grease, fingerprints etc.

The test specimen (8) is secured between the earth electrode base support (1) and the HV electrode base support (3) using the required length nylon stud bar (9) and nylon nuts (10) ensuring that the HV and earth electrodes (4) and (2) are in intimate contact with the test specimen (8).

The assembly is placed within an oil bath (11).

The oil (11) is allowed to settle so that there are no air bubbles in the oil (11).

It is ensured that there are no air bubbles trapped on the surface of either electrode (2) and (4) or the test specimen (8). The electrodes (2) and (4) are wiped with a brush or cloth to fully wet the surface of the electrodes (2) and (4) if necessary.

Part 2—Partial Discharge Test

Each time the setup is re-assembled the equipment is be recalibrated for a partial discharge level of 5 pC.

The voltage is slowly raised until either the partial discharge inception voltage or until 4/7 of the probable short time breakdown voltage is reached. The voltage increase is stopped when either of these criteria is reached. For the purposes of this test the partial discharge (PD) inception voltage is defined as the 5 pC discharge level. The voltage level is held for 10 s.

The Discharge Inception Voltage or the PD level is recorded at the maximum voltage as appropriate and the exact Discharge Magnitude is recorded.

The voltage is reduced to 0 V.

The partial discharge detector is turned off and removed.

Part 3—Breakdown Voltage Test—20 s Step-wise

The high voltage breakdown equipment is connected.

A starting voltage of 40% of the probable short time (nominal) breakdown voltage is applied.

For example, if the nominal breakdown voltage is expected to be ~55 kV from previous testing, a starting voltage of 22 kV is used.

If the test specimen withstands this voltage for 20 seconds the voltage is stepped up and then held at the next voltage level for 20 s before the voltage is increased again. The increase in the voltage is made as quickly as possible, without any transient over voltages. The time spent raising the voltage is included in the 20 s hold time in accordance with IEC 60243-1.

This is repeated until the test specimen breaks down.

The step size for the voltage increase is dependent on the magnitude of the voltage applied to the test specimen as shown below:

| Start Voltage range (kV) | Voltage step increase (kV) |
|---|---|
| 0-2 | 0.1 |
| 2-5 | 0.2 |
| 5-10 | 0.5 |
| 10-20 | 1 |
| 20-50 | 2 |

The breakdown voltage is recorded.

If present, as much blackened oil is removed from the oil bath as possible with a syringe.

The test specimen from the test assembly.

The location of the start and end of the breakdown, if visible, is recorded with a photograph.

After the breakdown has occurred the surface of both electrodes are cleaned and the oil is stirred/replaced before the start of the next run.

A minimum of 10 breakdown tests are conducted. Up to 20 breakdown tests may be conducted.

Results

| Polymer | Comparative PEEK polymer | | Example 1 | Example 2 |
|---|---|---|---|---|
| | Test 1 | Test 2 | | |
| Average breakdown voltage (kV/mm) | 21.10 | 21.40 | 26.70 | 25.92 |

As shown in the table above, polymers in accordance with the definition of the polymeric material of the electrical connector of the present invention showed significant—approximately 25%—improvements in breakdown voltage compared to a comparative PEEK polymer. Therefore, electrical connectors comprising insulating layers formed of the polymeric material as defined herein may be able to withstand higher temperatures and have higher electrical breakdown strength than prior art connection insulating layers. This is particularly useful for subsea connectors. Therefore, the present invention may allow the introduction of higher power connectors and/or smaller connector designs that deliver the same power compared to direct equivalents that use prior art thermoplastic polymers.

In summary, the present invention provides an electrical connector for subsea, offshore, or land-based applications, for supplying power to electrical equipment, the connector comprising: an insulating layered on at least a portion thereof with a polymeric material having a repeat unit of formula: —O-Ph-Ph-O-Ph-CO-Ph- (I) and a repeat unit of formula —O-Ph-Ph-O-Ph-SO$_2$-Ph-Ph-SO$_2$-Ph- (II); wherein Ph represents a phenylene moiety; and wherein the repeat units I and II are in the relative molar proportions 95:5 to 80:20. An assembly comprising the connector and a cable which is arranged to extend downhole from a tubing hanger to electric equipment, a method of manufacturing the connector, and a use of the polymeric material to insulate the pin of the electrical connector is also described. The connector is useful for delivering high voltage power to electrical equipment.

Although a few embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

For the avoidance of doubt, wherein amounts of components in a composition are described in wt %, this means the weight percentage of the specified component in relation to the whole composition referred to. For example, "wherein the composition comprises 20 to 99.9 wt % of the polymeric material" means that 20 to 99.9 wt % of the composition is provided by the polymeric material.

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. An electrical connector for conveying electricity to equipment, comprising:
    a first connector part comprising an electrically conductive pin and an insulating layer, and a second connector part comprising a socket;
    wherein the electrically conductive pin in the first connector part is configured for engagement with the socket of the second connector part and for transmitting power or data or both through the electrically conductive pin to the socket;
    wherein the insulating layer is in intimate contact with and at least partially covering the electrically conductive pin and electrically insulates the pin from a body of the first connector part of the connector;
    wherein the insulating layer comprises a polymeric material having a repeat unit of formula:

—O-Ph-Ph-O-Ph-CO-Ph-    I and a repeat unit of formula:

—O-Ph-Ph-O-Ph-SO$_2$-Ph-Ph-SO$_2$-Ph-    II wherein Ph represents a phenylene moiety; and
    wherein the repeat units I and II are in relative molar proportions 95:5 to 80:20.

2. The electrical connector according to claim 1, adapted for supplying electricity having a voltage of from 1 to 60 kV to electrical equipment.

3. The electrical connector according to claim 1, wherein the connector is subjected to a temperature in a range of from 100° C. to 200° C. and subjected to a pressure of from 10 MPa to 140 MPa, in use.

4. The electrical connector according to claim 1, wherein the pin is formed of a metallic material.

5. The electrical connector according to claim 1, wherein the polymeric material is arranged between the pin and at least one other component of the connector.

6. The electrical connector according to claim 1, wherein the repeat unit of formula I has the structure:

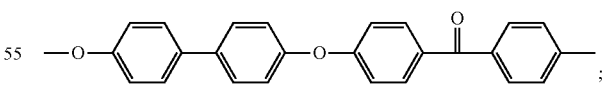

and
the repeat unit of formula II has the structure:

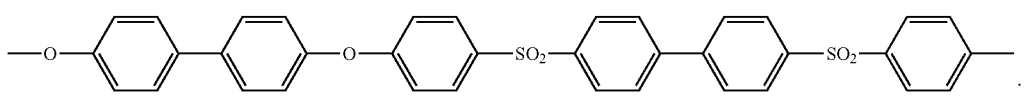

7. The electrical connector according to claim 1,
wherein the polymeric material includes 81 mol % to 90 mol % of repeat units of formula I.

8. The electrical connector according to claim 1,
wherein the polymeric material includes 10 mol % to 19 mol % of repeat units of formula II.

9. The electrical connector according to claim 1,
wherein the melting temperature (Tm) of the polymeric material is in a range 350° C. to 410° C., and/or wherein the polymeric material has a crystallinity of at least 25%.

10. The electrical connector according to claim 1,
wherein the polymeric material has an electrical breakdown voltage of at least 25 kV/mm.

11. The electrical connector according to claim 1,
wherein the polymeric material has a melt viscosity in a range of 0.2 $kNm^2\ s^{-1}$ to 0.8 $kNm^2\ s^{-1}$.

12. The electrical connector according to claim 1 adapted for use downhole in an oil or gas well.

13. The electrical connector according to claim 1,
wherein the electrical connector comprises a subsea electrical connector.

14. A cable termination assembly, comprising:
an electrical connector according to claim 1, and
a cable which is connected to the connector and arranged to extend from a tubing hanger to electrical equipment.

15. A cable termination assembly according to claim 14,
wherein the cable termination assembly comprises a subsea cable termination assembly.

16. A method of manufacturing an electrical connector, the connector comprising first and second connector parts; the method comprising:
a) providing an electrically conductive pin in the first connector part for engagement with a socket of the second connector part and for transmitting power and/or data through the pin from of the first connector part to the socket of the second connector part; and
b) providing an insulating layer in intimate contact with at least a portion of the pin, the insulating layer comprising a polymeric material, the polymeric material having a repeat unit of formula:

—O-Ph-Ph-O-Ph-CO-Ph-    I and a repeat unit of formula:

—O-Ph-Ph-O-Ph-SO$_2$-Ph-Ph-SO$_2$-Ph-    II wherein Ph represents a phenylene moiety;
wherein the repeat units I and II are in relative molar proportions 95:5 to 80:20;
c) arranging the pin and the insulating layer in the electrical connector.

17. A method according to claim 16,
wherein the method comprises a method of manufacturing a subsea electrical connector.

18. A polymeric material for electrically insulating a pin of an electrical connector, the polymeric material having a repeat unit of formula:

—O-Ph-Ph-O-Ph-CO-Ph-    I and a repeat unit of formula:

—O-Ph-Ph-O-Ph-SO$_2$-Ph-Ph-SO$_2$-Ph-    II wherein Ph represents a phenylene moiety;
wherein the repeat units I and II are in relative molar proportions 95:5 to 80:20.

19. The polymeric material according to claim 18,
wherein the pin comprises a pin of a subsea electrical connector.

20. The electrical connector according to claim 7,
wherein the polymeric material includes 82 mol % to 88 mol % of repeat units of formula I.

21. The electrical connector according to claim 8,
wherein the polymeric material includes 12 mol % to 18 mol % of repeat units of formula II.

* * * * *